(12) United States Patent
Kay

(10) Patent No.: US 7,604,218 B2
(45) Date of Patent: Oct. 20, 2009

(54) VALVES

(75) Inventor: Francis Xavier Kay, Akeley (GB)

(73) Assignee: F.X.K. Patent, Buckinghamshire (GB)

( * ) Notice: Subject to any disclaimer, the term of this patent is extended or adjusted under 35 U.S.C. 154(b) by 509 days.

(21) Appl. No.: 10/537,615

(22) PCT Filed: Dec. 2, 2003

(86) PCT No.: PCT/GB03/05197

§ 371 (c)(1),
(2), (4) Date: Dec. 5, 2005

(87) PCT Pub. No.: WO2004/051388

PCT Pub. Date: Jun. 17, 2004

(65) Prior Publication Data

US 2006/0138378 A1  Jun. 29, 2006

(30) Foreign Application Priority Data

Dec. 4, 2002 (GB) ................................ 0228294.5

(51) Int. Cl.
*F16K 39/00* (2006.01)

(52) U.S. Cl. .................... 251/282; 251/339; 137/505.42

(58) Field of Classification Search .................. 251/282, 251/339, 904, 366, 367; 128/204.26, 205.24; 137/505.18, 505.42, 454.6, 454.2, 494
See application file for complete search history.

(56) References Cited

U.S. PATENT DOCUMENTS

| | | | | |
|---|---|---|---|---|
| 1,190,514 A | * | 7/1916 | Cash | 137/505.42 |
| 1,603,112 A | * | 10/1926 | Jenkins | 137/505.42 |
| 1,679,826 A | * | 8/1928 | Jenkins | 137/505.42 |
| 2,343,146 A | * | 2/1944 | Jenkins | 137/316 |
| 2,806,471 A | * | 9/1957 | Faust | 137/116.5 |
| 2,806,481 A | * | 9/1957 | Faust | 137/116.5 |
| 3,058,717 A | * | 10/1962 | Wiltse | 251/149.6 |
| 3,075,545 A | * | 1/1963 | Eichelman | 137/505.18 |

(Continued)

FOREIGN PATENT DOCUMENTS

DE          1960320 A        6/1970

(Continued)

*Primary Examiner*—John K Fristoe, Jr.
*Assistant Examiner*—Marina Tietjen
(74) *Attorney, Agent, or Firm*—Eckert Seamans Cherin & Mellott, LLC; Carol A. Marmo, Esq.

(57) ABSTRACT

A valve module includes a valve housing (2) providing a chamber accommodating at least part of a valve member (3). The chamber forms part of a high pressure side of the valve. A valve port leads from the valve chamber to a low pressure side of the valve and the valve member co-operates with a valve seat around the valve port. The valve member is displaceable inwardly away from the valve seat to open the valve against a biasing spring biasing the valve member towards its closed position. The valve housing has on its low pressure side a shroud or wall (200) extending transversely with respect to the valve axis and spaced from the valve so as to deflect any gas exiting from the valve port in the direction parallel with the valve axis. The valve housing defines with the shroud or transverse wall (200) one or more transverse passages (113) leading to openings at the sides of the valve housing for the passage of gas issuing from the valve port.

8 Claims, 6 Drawing Sheets

U.S. PATENT DOCUMENTS

Figure 1:
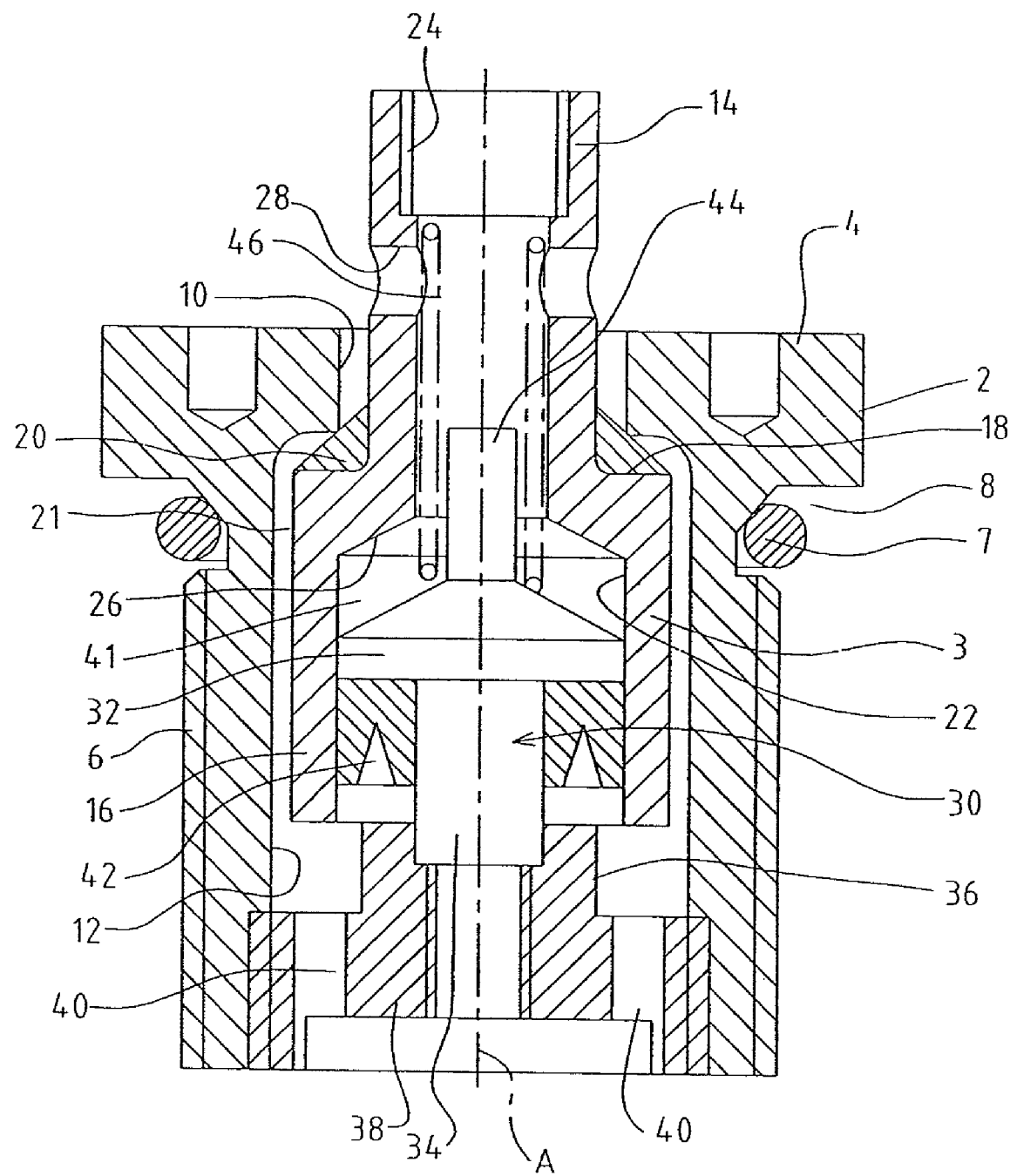

| | | | | |
|---|---|---|---|---|
| 3,167,323 | A | * | 1/1965 | Appleton et al. ............ 277/560 |
| 3,840,959 | A | | 10/1974 | Allen |
| 4,192,298 | A | | 3/1980 | Gass et al. |
| 4,417,503 | A | * | 11/1983 | Izumi .......................... 92/240 |
| 4,793,379 | A | * | 12/1988 | Eidsmore ............... 137/614.19 |
| 4,799,285 | A | * | 1/1989 | Berfield ..................... 15/327.1 |
| 5,357,950 | A | | 10/1994 | Wippler et al. |
| 5,452,883 | A | * | 9/1995 | Holson et al. ............ 267/64.28 |
| 5,911,220 | A | * | 6/1999 | Morgan et al. ......... 128/205.24 |
| 2003/0085372 | A1 | * | 5/2003 | Newton ................... 251/149.1 |
| 2005/0236596 | A1 | * | 10/2005 | Nowling et al. ............. 251/149 |

FOREIGN PATENT DOCUMENTS

| | | |
|---|---|---|
| DE | 29911365 U | 9/1999 |
| EP | 1 193 433 A2 | 4/2002 |
| EP | 1262402 A | 12/2002 |
| FR | 1252720 A | 2/1961 |
| GB | 2298026 A | 8/1996 |

* cited by examiner

VALVES

THIS INVENTION relates to fluid control valves, such as valves for the control of the flow of air or other gases, for example in pressure regulating and pressure reducing valves.

GB2298026 describes a valve module for a pressure regulator—or pressure reducer—which closely approaches the ideal of an inlet valve which is in perfect balance when primary pressure is applied to an inlet connection, and the valve is in the closed condition.

The valve module of GB2298026 is of particular utility for a pressure regulator for controlling pressurised gas supplied from a storage cylinder, where the primary pressure applied to the regulator is progressively reduced as the volume of air or other gas within the cylinder is used up.

GB2298026 discloses a poppet valve comprising a valve port, a valve seat around the valve port, a valve member co-operating with the valve seat and displaceable along an axis passing through said port and having a stem extending through said port, and a shoulder for sealing engagement with said seat, and wherein said valve member has a bore extending into the valve member from an end thereof remote from said stem and communicating with an outlet from said stem, biasing means being provided biasing said valve member towards its closed position and wherein a piston is sealingly slidable in the said bore, whereby the effective area of said valve member acted on by the fluid pressure difference between said first and second sides of said valve is substantially reduced as compared with the area encompassed by said valve seat.

It is among the objects of the present invention to provide an improved form of the valve of GB2298026.

According to one aspect of the invention there is provided a valve including a valve housing providing a chamber accommodating at least part of a valve member, said chamber forming at least part of a first or high pressure side of said valve, a valve port leading from said chamber to a second or low-pressure side of said valve, a valve seat around the valve port, said valve member having a seating surface co-operating with the valve seat and the valve member being displaceable, along an axis passing through said port, respectively (a) in a first direction, to move said seating surface into said chamber and away from said valve seat and (b) in a second, opposite direction, to move said seating surface towards said valve seat, biasing means being provided biasing said valve member in said second direction towards its closed position, wherein the valve housing affords, on third low pressure side, a shroud or wall extending transversely with respect to the valve access and spaced from said annular orifice so as to deflect any gas proceeding from said annular orifice in a direction parallel with said valve access, the valve housing defining with said shroud or transverse wall one or more transverse passages leading to opening at the sides of the valve housing, for the passage of gas issuing from said valve port.

According to another aspect of the invention there is provided a valve including a valve housing providing a chamber accommodating at least part of a valve member, said chamber forming at least part of a first or high pressure side of said valve, a valve port leading from said chamber to a second or low-pressure side of said valve, a valve seat around the valve port, said valve member having a seating surface co-operating with the valve seat and the valve member being displaceable, along an axis passing through said port, respectively (a) in a first direction, to move said seating surface into said chamber and away from said valve seat and (b) in a second, opposite direction, to move said seating surface towards said valve seat, the valve member having a bore extending axially from the high pressure end thereof and forming a cylinder sealingly slidable, in said first and second directions, on a piston fixed within said valve housing, to define therewith a further chamber, biasing means being provided biasing said valve member in said second direction towards its closed position, said further chamber in either case communicating with the low pressure side of the valve, whereby the effective area of said valve member acted on by the fluid pressure difference between said first and second sides of said valve is substantially reduced as compared with the area encompassed by said valve seat, and wherein said piston has a base part providing an outer periphery received in an internal recess or groove provided around a bore which extends axially into the valve housing from a high pressure end thereof and which bore at least partially defines said chamber accommodating the valve member, said internal recess or groove being disposed at a location remote from said valve seat, the valve housing having one or more longitudinal slits therethrough extending from the high pressure end of the valve housing, (i.e. the end remote from said valve seat) adjacent said internal groove or recess and extending through the location of said internal groove or recess, the material of the valve housing being sufficiently resilient to allow the wall of the valve housing to be flexed outwardly sufficiently to allow said base part to pass within said bore in the valve housing from said high pressure end thereof to the axial position of said internal groove or recess and thereafter to spring back around said base part to locate said base part in said internal groove or recess.

According to a yet further aspect of the invention there is provided a sealing arrangement comprising a body having a bore, a seal for sealing said bore with respect to a piston or the like member disposed centrally within the bore and providing a larger diameter portion engaging, or closer to, the wall of said bore and a smaller diameter portion on a higher pressure side of said larger diameter portion, said seal comprising a resilient material which is generally U-shaped in half-section along the axis of said bore, the seal providing a base part abutting a shoulder extending from the periphery of said larger diameter part to the periphery of said smaller diameter part, said base providing the base of the U-section, the seal including an inner sleeve, defining an inner limb of said U-section and extending around said smaller diameter part, and extending away from said base to a free edge, the seal further including an outer sleeve extending from said base part along said bore to a free edge of the outer sleeve, said outer sleeve defining the other limb of said U-section, and wherein said outer sleeve, in an unstressed state of said seal, (and thus in an un-installed state) diverges slightly from the axis of the seal, with increasing distance from said base.

In the accompanying drawings:—

Figure 2:
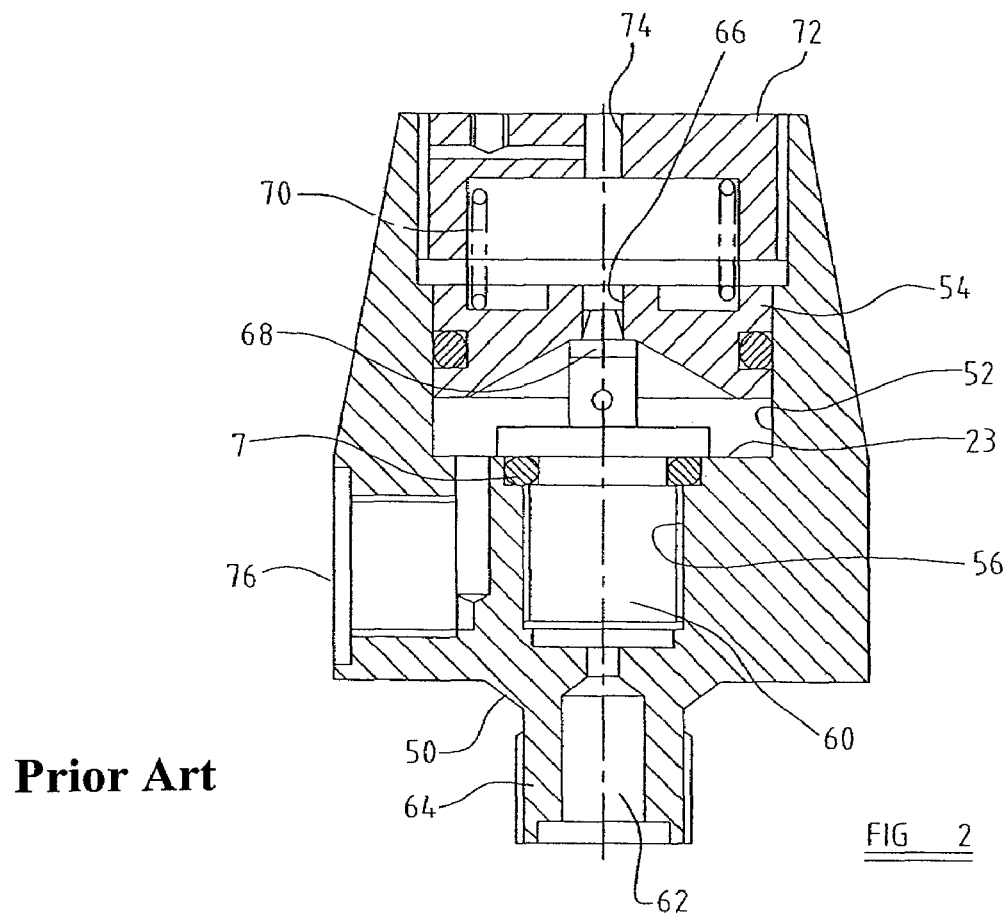
Figure 3:
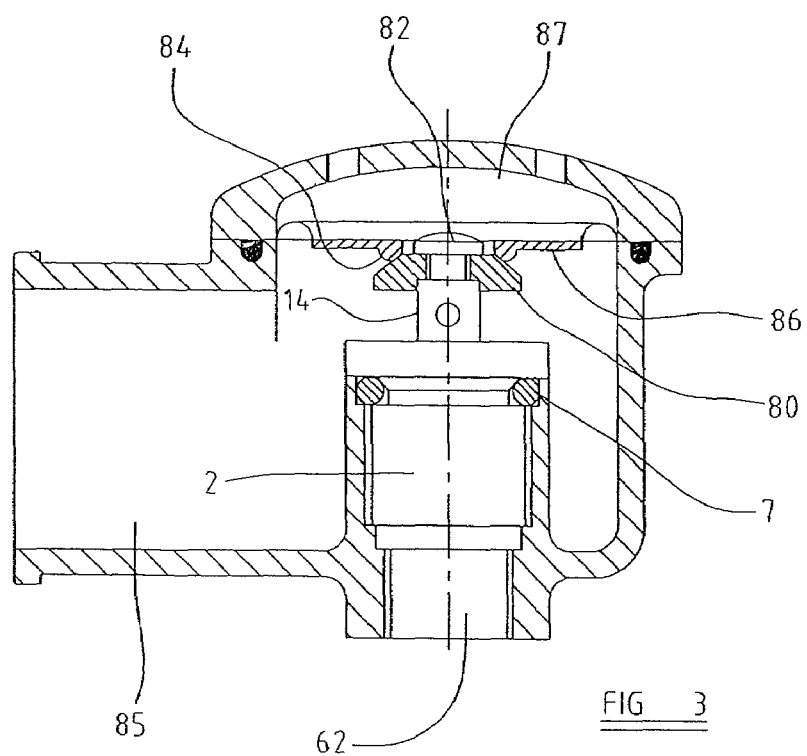
Figure 4:
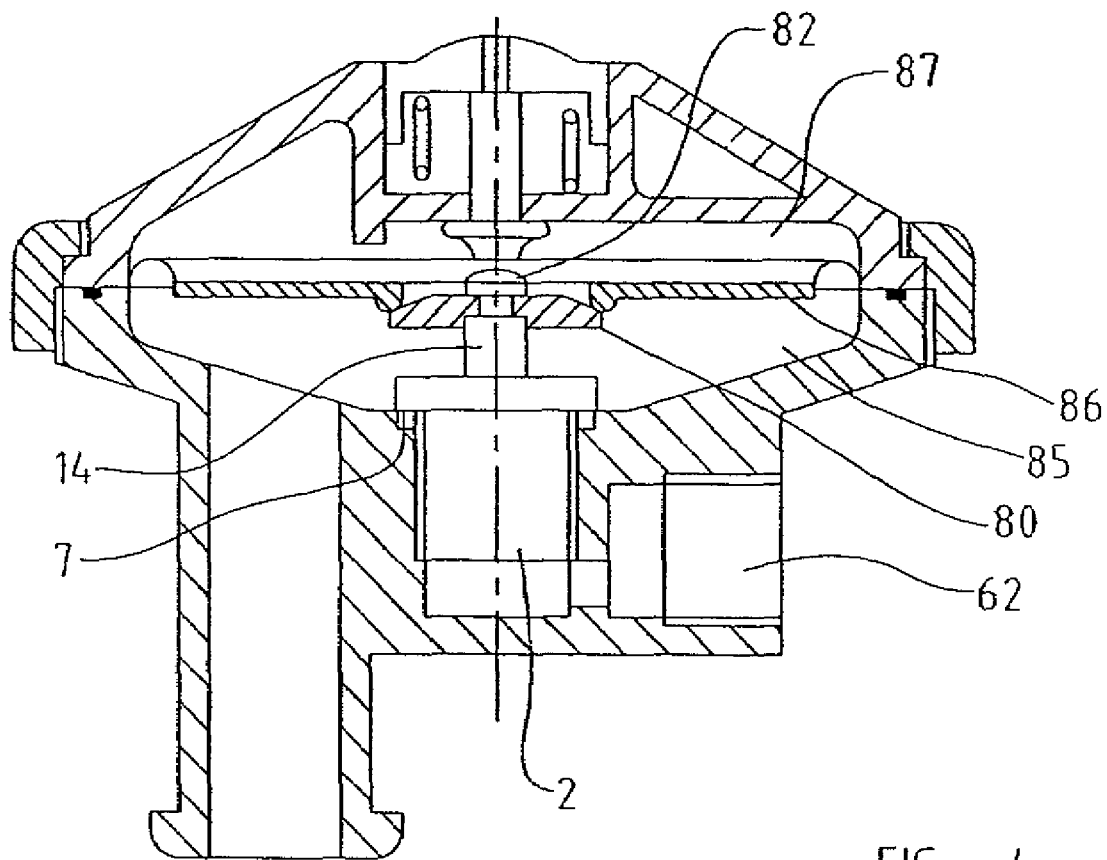
Figure 5:
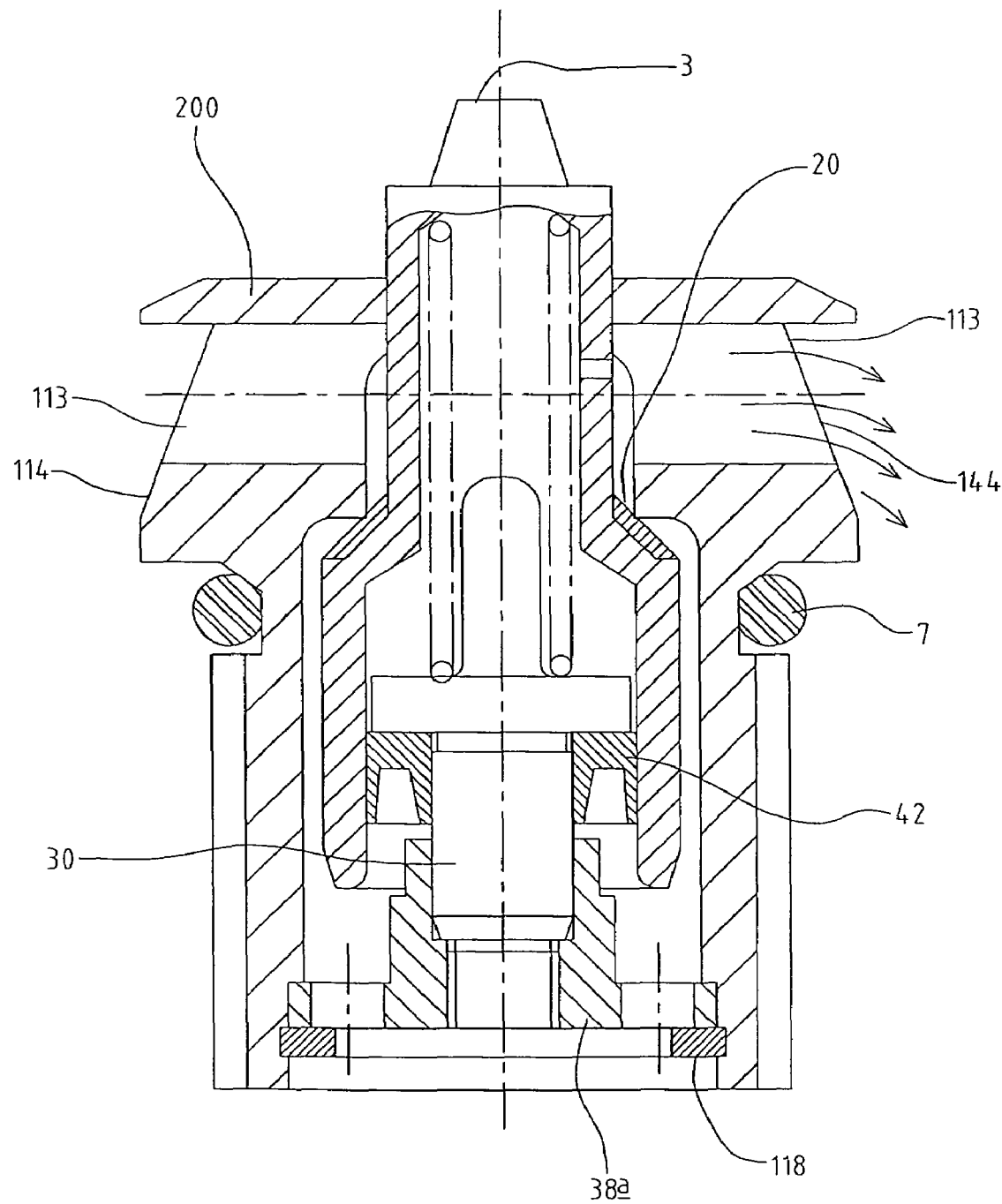
Figure 6:
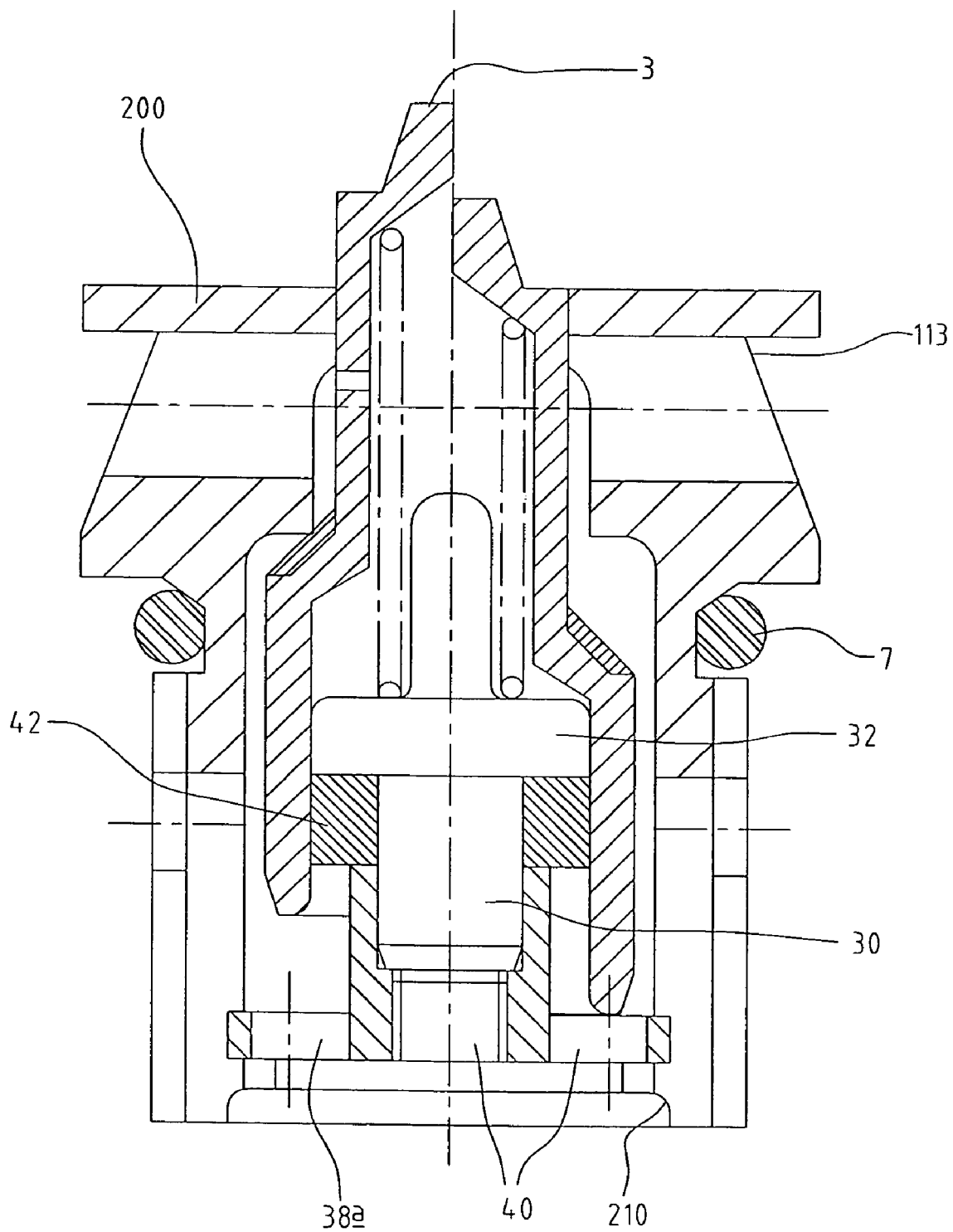
Figure 7:
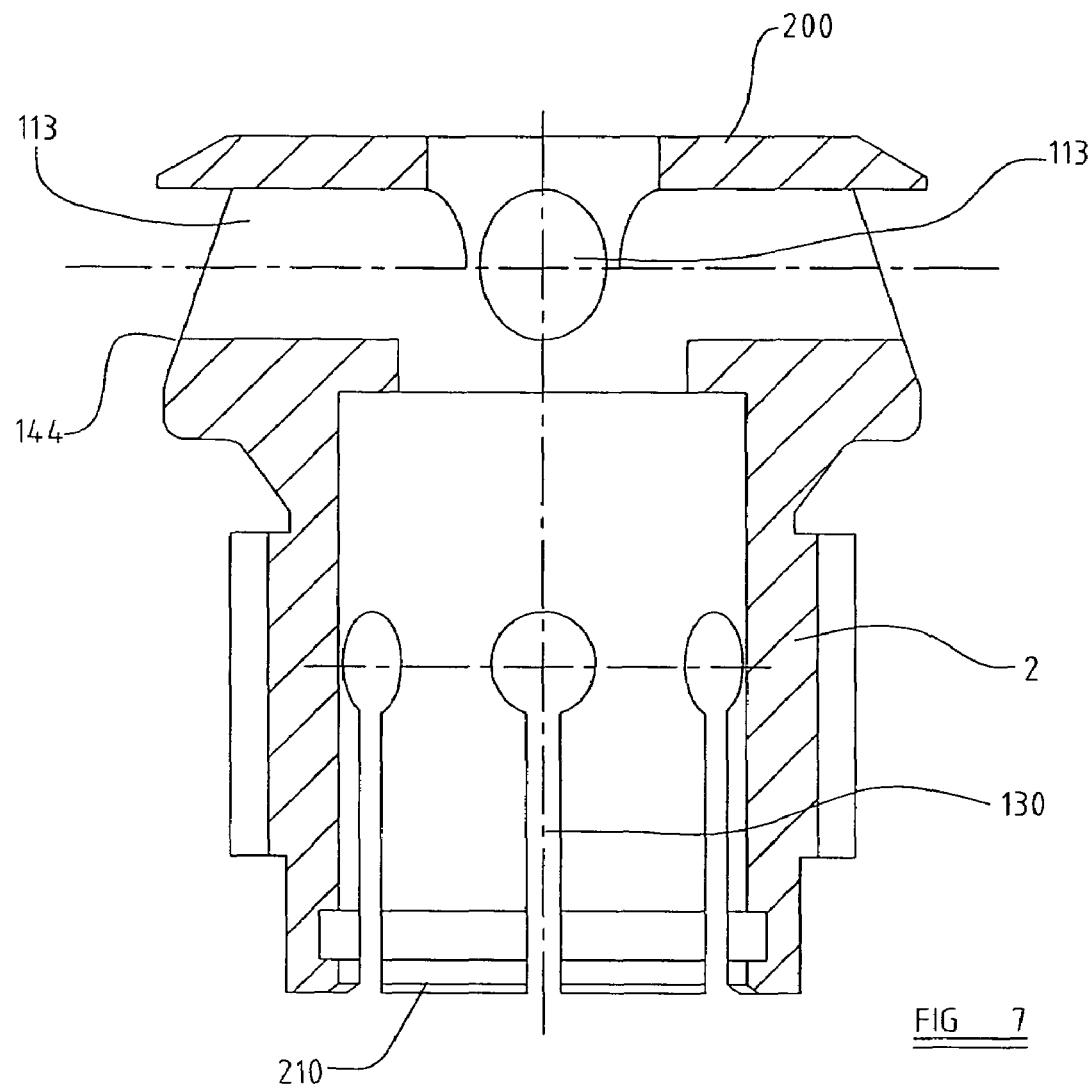
Figure 8:
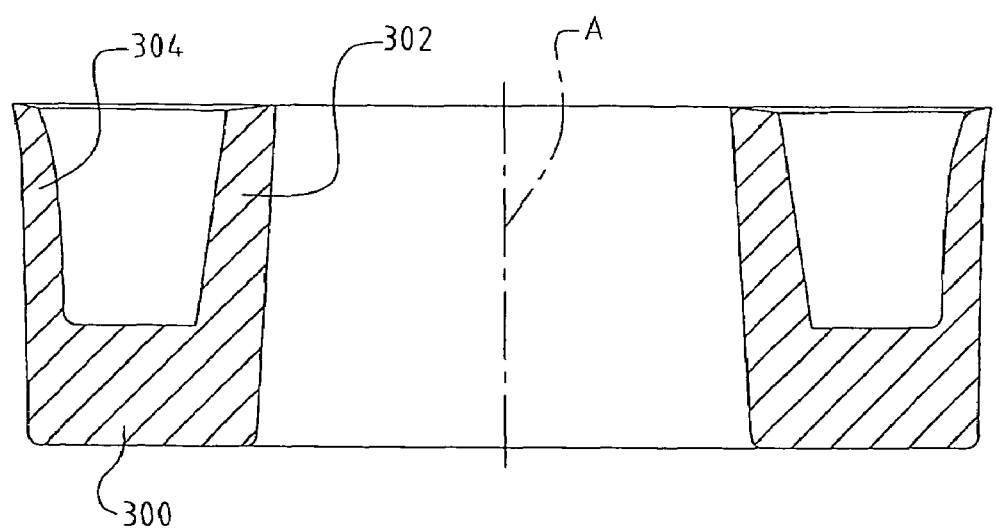

FIG. 1 is a view in axial section of a valve module described in GB2298026,

FIG. 2 is a view in axial section of a pressure reducing valve incorporating a valve module in accordance with FIG. 1, FIGS. 3 and 4 are views similar to FIG. 2 of other forms of valve incorporating valve modules in accordance with FIG. 1, FIG. 5 is a view in axial section of a variant embodying the present invention of the valve module of FIG. 1, FIG. 6 is an axial section view of a variant, embodying the invention, of the valve module of FIG. 5, with the valve member shown in a closed position on the right-hand side, FIG. 7 is a view in axial section through the valve housing of the valve module of FIG. 6, and FIG. 8 is a view in axial section, to an enlarged scale of a seal forming part of the valve module of FIGS. 5 to 7.

Referring to FIG. 1, the valve module shown possesses substantial circular symmetry about an axis A in the plane of the drawing. The valve module comprises a hollow generally cylindrical body 2 including an end part 4 and an externally screw threaded portion 6 extending from end part 4 and of reduced diameter with respect to the part 4, whereby the peripheral region of part 4 forms an outwardly directed annular flange. A chamfered annular groove 8 is formed around the body 2, between the flange formed by the end portion 4 and the externally screwthreaded part of portion 6. A sealing O-ring 7 is received in this groove.

The body 2 has a stepped axial bore therethrough within which is accommodated a hollow valve member or poppet 3. This stepped bore includes a port 10 extending through end part 4 and a bore portion 12 which is of increased diameter with respect to port 10. The bore portion 12 extends to the end of body 2 remote from part 4 and has an internal screw thread over a region immediately adjacent the last-mentioned end of the body. The valve member or poppet 3 includes a stem portion 14 which extends freely through the port 10 and a body portion 16 of larger diameter than the stem portion 14 and of larger diameter than the port 10. At its end nearer port 10, the bore 12 terminates in an internal shoulder which meets the port 10 in an annular edge or rim which forms a valve seat. The poppet 3 has, around its periphery, an annular shoulder 18 facing towards the valve seat and extending from the periphery of the stem portion 14 to the periphery of part 16. A seating surface of the poppet, for engagement with the valve seat, is provided by a ring or fillet 20 of elastomeric material received on said shoulder 18. As shown, this ring 20 of elastomeric material occupies the "corner" region between the shoulder 18 and the periphery of stem portion 14. The ring or fillet 20 presents, towards the valve seat, a surface which is generally frusto-conical about axis A.

The elastomeric material forming ring or fillet 20 may be applied initially in a liquid or fluid state and caused to cure in situ on the poppet 3, so as to be bonded thereto.

In a variant, not shown, the poppet 3 is made as a unitary body of an appropriate polymer, such as polyethylene, nylon or polyurethane. In this case, the form of the poppet may be substantially that of the poppet 3 plus fillet 20 of FIG. 1, i.e. the fillet 20 may be formed as an integral part of the poppet rather than as a separately formed item.

The larger diameter part 16 of the poppet 3 has a bore 22 extending axially from its end remote from the stem portion 14. The stem portion 14 has an axial bore 24 of lesser diameter than the bore 22 and communicating with the bore 22. In the embodiment shown in the drawing, the bore 22 communicates with the bore 24 via a frusto-conical tapering bore section 26. The bore 24 is internally screwthreaded at its upper end (as viewed in FIG. 1) to receive a tappet or other member (not shown in FIG. 1 see below) and a transverse bore 28 through the stem 14 provides communication between the bores 22, 24 and the low-pressure side of the valve.

Received as a close sliding fit in the bore 22 is a piston 30 having a head 32 and a cylindrical body 34 extending from the head 32 in the direction away from the valve seat, to engage a spigot portion 36 of a retaining insert 38, which is screw threadedly received in the internally screw threaded end portion of bore 12 remote from the valve seat. Holes 40 are provided through the region of the insert 38 between its periphery and the spigot portion 36 for the passage of the gas which the valve is intended to control.

The piston body 34 carries an annular seal 42 which seals the piston 30 with respect to the bore 22 of the poppet 3. A spigot 44 projects axially from the piston head 30 towards the narrower bore 24 of the poppet 3 and serves to locate one end of a biasing compression spring 46, the other end of which engages abutment means in the stem portion 14 of the poppet 3, for example the tappet or other member referred to above (not shown in FIG. 1) screwed into the upper end of bore 24. The spring 46 thus urges the poppet 3, relative to piston 30, towards the valve seat. The spigot portion 36 of insert 38 is of a size to pass freely within the bore 22 in the poppet 3 so as not to obstruct displacement of the poppet away from the valve seat.

The piston body 34 is, at its end remote from head 32, externally screw threaded and screwed into an internally screw threaded axial bore through insert 38 whereby the piston 30 is retained against movement relative to the body 2.

The seal 42 may be made of tough P.T.F.E. and ensures effective sealing between the piston 30 and the poppet 3 whilst affording little friction between the seal 42 and the poppet 3, even at high primary pressures. Consequently the spring 46 need only be a light spring.

In use of the valve module shown in FIG. 1 (and as will appear from the description below with reference to FIGS. 2 to 4) the space 21 within the bore 12 and extending around the exterior of portion 16 of the poppet 3 is exposed to the high or primary gas pressure, and is thus on the high pressure side of the valve module, whilst the bore 24 and the external face of part 4 facing away from portion 6 is exposed to the low, secondary, set or regulated gas pressure, and are thus on the low pressure side of the valve module.

In the arrangement shown, the diameter of the bore 22 is substantially equal to that of the port 10 (i.e. to the inner diameter of the valve seat), so that, when the valve is closed, the gas pressure on the low pressure side of the valve module produces no net force parallel to the axis A on the poppet 3 and likewise, neglecting the finite width of the valve seat, the gas pressure on the high pressure side of the valve module produces no net force parallel to the axis A on the poppet 3. The valve is thus, in principle, balanced. At the same time, the diameter of the valve seat is substantially larger than would be practicable for an unbalanced valve, in many applications, allowing for substantially greater gas flow rates.

Accordingly, a small complete inlet valve assembly or module, of the kind described with reference to FIG. 1, can serve a wide range of pressure regulator requirements and, being in modular form, can be assembled and tested independently of any valve body into which it may be eventually fitted.

The assembly shown in FIG. 1 comprises a prefabricated module which can be readily fitted into a wide variety of pressure regulating valves or demand valves designed to receive the module. The bore 24, adjacent the free end of stem 14, may be internally screw threaded to receive any of a variety of fitments according to the intended use of the valve. It is thus possible for the prefabricated module of FIG. 1, (or the variant of FIG. 5, described below) to be manufactured and fully tested by a specialist manufacturer and supplied to various different manufacturers of pressure regulating valves, demand valves, etc. for fitting in the latter.

Referring to FIG. 2, a pressure regulating valve is illustrated having a body 50 providing a cylindrical chamber 52 in which a reaction member or piston 54 is sealingly slidable. A screw threaded bore 56 extends from an end wall 58 of chamber 52 and receives a valve module 60 such as the valve module described with reference to FIG. 1, the externally threaded portion 6 of the body 2 of the module being screwed into the bore 56. When the module is fitted in the valve body 50 as shown in FIG. 2, the 0 ring 7 is received in an annular rebate formed around the bore 56 between the end wall 58 and the screw threaded portion of bore 56, thereby sealing the body 2 with respect to the body 50. The lower end of the bore 56 communicates with an inlet port 62 in an inlet coupling 64 adapted to be screwed into a discharge fitting of a compressed gas cylinder, for example. The reaction member 54 has a central aperture 66 therethrough via which, in certain positions of the valve as described below, gas can vent from the chamber 52. A valve member 68 having a stem (not shown) screwed into the upper end of stem 14 co-operates with the aperture 66 and normally seals off the aperture 66. The reaction member 54 is urged towards the valve module and thus towards engagement with the valve member 68 by a compression spring indicated schematically at 70. The spring 70 is held in compression between the reaction member 54 and a cap 72 screwed into an internally threaded enlarged upper portion of the bore 52. As shown, the cap 72 has an aperture 74 therethrough for venting purposes.

An outlet passage 76 for gas communicates with the interior of chamber 52. In operation, if the pressure in chamber 52 falls below a predetermined level determined by the spring 70 (as a result of gas being drawn from the chamber 52 via the port 76) the spring 70 displaces the reaction member 54 and thus, via the valve member 68, the poppet 3 of the module 60 downwards as viewed in FIG. 2, thereby displacing the poppet seal 20 from the co-operating valve seat and allowing gas under pressure, from inlet 62, to pass into the chamber 52, thereby raising the pressure in chamber 52 to counteract the tendency of the spring 70 to displace the reaction member 54 downwardly. If, as a result of some fault, in the valve module 2, for example, as a result of the seal 20 failing to seat sealingly on the valve seat, gas under pressure should continue to leak through the valve module into the chamber 52 despite the pressure in chamber 52 being at or above the preset pressure, the reaction member 54 will be forced upwardly so as to disengage the valve member 68 from its sealing engagement around the lower end of aperture 66, allowing excess pressure to vent through the aperture 66 past the valve member 68.

FIGS. 3 and 4 illustrate valve modules of the same form incorporated in demand valves. FIG. 3 illustrates a demand valve for a breathing apparatus suitable for fire-fighters, for example, whilst FIG. 4 illustrates a demand valve for a diving system. In the arrangements of these figures, the upper end of the stem 14 carries a chamfered annular valve plate 80 secured to the upper end of the valve stem 14 by a retaining screw 82 screwed into the valve stem. The frusto-conical surface of the valve plate 80, in each case, co-operates with an annular sealing bead 84 around a central aperture in a diaphragm 86 which divides a chamber provided within the valve body into a first region 85, in communication with the low pressure side of the valve module and a venting chamber 87 on the opposite side of the diaphragm 86 from the valve plate 80. In each case, the valve module body 2 is screwed into a complementary screw threaded bore provided in the body of the valve proper and is sealed with respect thereto by the 0-ring 7 in substantially the same way as described in relation to FIG. 2.

In the designs shown for the valve module of FIG. 1, (GB2298026), the valve body or housing 2 terminates at the outlet end, in an open annulus defined between the valve port 10 in the body 2 itself, and the stem 14 of the poppet 3. This feature provides maximum free flow, but that freedom of flow can cause practical problems for some applications.

It has now been found that if the top of the module body or housing 2 is extended upwards, to form a transverse wall or shroud 200 (FIG. 5), this prevents direct upward flow of the out flowing working gas. In addition to this benefit, a bearing surface is provided by an axial bore in the shroud or wall 200, to support and guide the axial extension 14 of the poppet 3 and to maintain the alignment of the latter, and thus eliminating any tendency of the poppet seating 20 to move out of line. The extension 200 of the valve body 21 is, effectively, bored out to the seat diameter of the valve port or seat 10 up to a distance just short of the top of the extension 14, to allow free flow of gas, whilst the remaining portion of the shroud forms a bearing for the extension 14. To provide output flow of gas, transverse outlet bores 113 of any convenient number and size radiate from with the axial bore in the shroud 200 to respective openings on the periphery of the valve housing, so that gas outflow is translated from the axial sense to the radial sense.

In many cases, (cf. FIGS. 3 and 4) the pressure take-off from the module is in a plane at, or below the surface of the material into which the module is mounted. It is now proposed, in order to aid this downward flow, to undercut part of the side wall of the valve housing in the region of the extension or shroud 200 at an angle to the valve axis to provide a sloping peripheral wall or surface 144 of the valve housing. As the air, or other working gas flows from the radial holes 113, the angle of the exit of the truncated radial holes, and the angle of the wall, causes dynamic adhesion to the gas medium, so that instead of the flow being truly radial, it flows naturally outward, and downward towards the outlet port, or downstream passageway of the demand valve or the like in which the valve module is fitted. By this means, any tendency for the air flow to impinge on the underside of the reaction member of, say, a pressure regulator, is very much reduced, or even, dependent upon the conditions, eliminated. Where, as illustrated, the valve housing has substantial rotational symmetry about its central axis, the inclined surface 144 is part-conical and the upper end of the shroud forms, at its periphery, a projecting annular ledge.

The valve module of GB2298026 shown in FIG. 1 can be further improved, from a production point of view, by eliminating the screw threaded connection between the insert 38 which supports the piston member 30 and the valve housing 2. Whilst, as shown in FIG. 5, the insert (referenced 38a in FIG. 5) may simply be a push fit in a recess formed around the lower end of the axial bore 12 in the valve housing 2, and retained in placed by a circlip 118 engaging in a circumferential groove around the wall of such a recess, a further improved design is possible. In this improved design, shown in FIGS. 6 and 7, the valve body 2 is conveniently slit longitudinally four or so times, as shown at 130 in FIG. 7, from its lower edge, like a collet. The valve body 2 in this case, is formed with a circumferential groove internally adjacent its lower end and has a chamfered mouth, 210 at its lower end so that the piston support (referenced 38b in FIG. 7), which may be chamfered at its outer edge, can be snapped into place. With the elimination of the circlip any possibility for the circlip to offer any impedance to the inlet air passages 40 through the insert 38b is also eliminated, thus helping to optimise the airflow capacity of the module.

It will be understood that the inserts 38, 38a, 38b are formed separately from their pistons 30 only for reasons of construction or assembly. The inserts 38, 38a, 38b, in use, remains fixed with respect to their respective pistons 30 and can be regarded as parts of their pistons 30. Indeed, any such insert could be formed integrally with the respective piston 30 or with the lower part of the respective piston 30.

It has been found that the contour and proportions of the conventional plastics seals are not suitable for sensitive pressure control functions, as they are thick and insensitive. Even the seal 42 of the valve of FIG. 1 is deficient in this respect. A new seal contour has been developed by the inventor, to overcome these shortcomings. A cross section of the newly developed seal is shown in FIG. 8. The seal is, of course, generally annular in form having rotation of symmetry about its central axis A. FIG. 8 is a view in section along that axis. It is in the nature of PTFE and similar materials that they have very limited stretch ability and poor memory. Therefore, very careful sizing, shaping and proportioning is necessary to ensure that the sealing lip of a seal made of such material is in firm, but tight contact with the bore against which it is to seal, e.g. with the bore 22 in valve member 3 where the seal is used on piston member 30.

When using the developed form shown in FIG. 8, it has been found possible to use the same seal for both high pressure and low pressure module applications, thus overcoming the problem of sensitivity to variable pressure supply, encountered with the use of 'O' rings. The use of one seal for both applications provides a useful degree of economy in the manufacture of component parts. With this improvement in design, the only difference between a high pressure and low pressure valves module of the kind shown in the drawings lies in the choice of poppet return spring. This difference is dictated by the extra seal drag which can be experienced by a module subject to hundreds of atmospheres, whereas, for really sensitive valves, such as a breathing apparatus demand valve, the slight extra thrust of the high pressure spring, can constitute a significant proportion of the allowable actuating or signal pressure. Typically, the inlet pressure of such a demand valve would rarely be higher than something of the order of 10 bar.

FIG. 8 shows typical dimensions of the improved seal for the external and internal diameters concerned. The critical features are the curves and angles, within the notional (not manufacturing) tolerances shown. But the proportional dimensions will apply for seals of this type of whatever size.

The seal of FIG. 8 is of a resilient material and is generally U-shaped in half-section along the central axis A. The seal provides a base part 300 which, when the seal is fitted, for example in place of the seal 42 in the valve module of FIG. 1,5,6 or 7, abuts the shoulder of the piston 30,32 which extends from the periphery of the head 32 of the piston to the periphery of the integral smaller diameter shank or rod of the piston, said base 300 providing the base of the U-section. The seal includes an inner sleeve 302, defining an inner limb of said U-section and extending around said smaller diameter piston rod, and extending away from said base 300 to a free edge of the inner sleeve. The seal further includes an outer sleeve 304 extending from said base part along said bore to a free edge of the outer sleeve, said outer sleeve defining the other limb of said U-section. The outer sleeve 304, in the unstressed state of the seal shown in FIG. 8, (Which is its un-installed state) diverges slightly from the axis A of the seal, with increasing distance from said base 300. Similarly, the inner sleeve, in an un-stressed state of the seal, converges slightly towards said central axis A of the seal with increasing distance from said annular base 300. The outer sleeve 304 tapers in radial thickness towards its free edge. The outer sleeve, in semi-axial section, is curved outwardly towards its free edge.

As shown, the thickness of the base part 300, measured axially, is greater than twice the greatest radial thickness of the outer sleeve and greater than twice the greatest thickness of the inner sleeve.

Whereas PTFE is mentioned as a suitable seal material, other types of plastics may be employed. For example, where such a valve module design is used in industrial pneumatics applications, injection moulded, polyethylene could be used, either in "as moulded" condition, or subjected to gamma irradiation. Use of this, injection-moulding material could significantly reduce production cost.

The invention claimed is:

1. A valve including a valve housing providing a chamber accommodating at least part of a valve member, said chamber forming at least part of a first or high pressure side of said valve, a valve port leading from said chamber to a second or low-pressure side of said valve, a valve seat around the valve port, said valve member having a seating surface co-operating with the valve seat and the valve member being displaceable, along an axis passing through said port, respectively (a) in a first direction, to move said seating surface into said chamber and away from said valve seat and (b) in a second, opposite direction, to move said seating surface towards said valve seat, biasing means being provided biasing said valve member in said second direction towards its closed position, the valve housing having an extension extending, in said second direction, beyond said port and forming a transverse wall at an axial end of said extension at a distance from said port, said extension having an axial bore extending from said port and forming a central aperture in said transverse wall, which aperture forms a bearing for an axial extension of said valve member through which bearing said axial extension passes as a sliding fit, whereby the valve member is guided for said axial movement, said axial bore being bored out to a seat diameter of the valve port up to a distance just short of said transverse wall to provide a passage for gas from said port and at least one transverse outlet bore radiating from said axial bore to a respective opening in a side wall of said extension, on the periphery of the valve housing, so that gas outflow from said port is translated from the axial sense to the radial sense, the transverse wall serving to deflect any gas proceeding from said valve port in a direction parallel with said valve axis, wherein the periphery of said extension of the valve housing is undercut in the region behind the transverse wall, in such a way that said undercut region becomes gradually increasingly spaced from said axis with distance, measured parallel with said axis, away from said transverse wall, so that over said undercut region, the peripheral surface of the valve body is inclined with respect to said axis, and wherein one or each said opening or openings at the side of the valve body opens onto said inclined peripheral surface which serves to direct any gas exiting the opening or openings in a downward direction towards an outlet port of the valve.

2. A valve including a valve housing providing a chamber accommodating at least part of a valve member, said chamber forming at least part of a first or high pressure side of said valve, a valve port leading from said chamber to a second or low-pressure side of said valve, a valve seat around the valve port, said valve member having a seating surface co-operating with the valve seat and the valve member being displaceable, along an axis passing through said port, respectively (a) in a first direction, to move said seating surface into said chamber and away from said valve seat and (b) in a second, opposite direction, to move said seating surface towards said valve seat, the valve member having a bore extending axially from the high pressure end thereof and forming a cylinder sealingly slidable, in said first and second directions, on a piston fixed within said valve housing, to define therewith a further chamber, biasing means being provided biasing said valve member in said second direction towards its closed position, said further chamber in either case communicating with the low pressure side of the valve, and wherein said piston has a base part or a supporting insert providing an outer periphery received in an internal recess or groove provided around a bore which extends axially into the valve housing from a high pressure end thereof and which bore at least partially defines said chamber accommodating the valve member, said internal recess or groove being disposed at a location remote from said valve seat, the valve housing having one or more longitudinal slits therethrough extending from the high pressure end of the valve housing, adjacent said internal groove or recess and extending through the location of said internal groove or recess, the material of the valve housing being sufficiently resilient to allow the wall of the valve housing to be flexed outwardly sufficiently to allow said base part or insert to pass within said bore in the valve housing from said high pressure end thereof to the axial position of said internal groove or recess and to allow the wall of the valve housing thereafter to spring back around said base part or insert to locate said base part or insert in said internal groove or recess.

3. A valve as claimed in claim 2 wherein the lower edge of the bore in the valve housing is internally chamfered and/or wherein the outer edge of said base part is externally chamfered, to facilitate insertion of the base part or insert into the bore in the valve housing from said lower end of the valve housing, wherein the lower edge is the high pressure edge and the lower end is the high pressure end.

4. The valve of claim 2, including: a sealing arrangement comprising said valve member having said bore, a seal for sealing said bore with respect to said piston disposed centrally within the bore and providing a larger diameter portion engaging, or closer to, the wall of said bore and a smaller diameter portion on a higher pressure side of said larger diameter portion, said seal comprising a resilient material which is generally U-shaped in half-section along the axis of said bore, the seal providing a base part abutting a shoulder extending from the periphery of said larger diameter part to the periphery of said smaller diameter part, said base providing the base of the U-section, the seal including an inner sleeve, defining an inner limb of said U-section and extending around said smaller diameter part, and extending away from said base to a free edge, the seal further including an outer sleeve extending from said base part along said bore to a free edge of the outer sleeve, said outer sleeve defining the other limb of said U-section, and wherein said outer sleeve, in an unstressed state of said seal, wherein said unstressed state is an un-installed state diverges slightly from the axis of the seal, with increasing distance from said base.

5. The valve of claim 2, including: a sealing arrangement wherein the inner sleeve, in an un-stressed state of the seal, converges slightly towards said central axis of the seal with increasing distance from said annular base.

6. A valve including a valve housing providing a chamber accommodating at least part of a valve member, said chamber forming at least part of a first or high pressure side of said valve, a valve port leading from said chamber to a second or low-pressure side of said valve, a valve seat around the valve port, said valve member having a seating surface co-operating with the valve seat and the valve member being displaceable, along an axis passing through said port, respectively (a) in a first direction, to move said seating surface into said chamber and away from said valve seat and (b) in a second, opposite direction, to move said seating surface towards said valve seat, the valve member having a bore extending axially from the high pressure end thereof and forming a cylinder sealingly slidable, in said first and second directions, on a piston fixed within said valve housing, to define therewith a further chamber, biasing means being provided biasing said valve member in said second direction towards its closed position, said further chamber in either case communicating with the low pressure side of the valve, and wherein said piston has a base part or supporting insert providing an outer periphery received in an internal recess or groove provided around a bore which extends axially into the valve housing from a high pressure end thereof and which bore at least partially defines said chamber accommodating the valve member, said internal recess or groove being disposed at a location remote from said valve seat, wherein the base part or supporting insert is designed for resilient inward flexing to allow it to be inserted in the bore in the valve housing from said high pressure end thereof to spring into said groove when the base part or insert is at the longitudinal position of said internal groove or recess, thereby to retain said piston in place, wherein the lower edge of the bore in the valve housing is internally chamfered and/or wherein the outer edge of said base part is externally chamfered, to facilitate insertion of the base part or insert into the bore in the valve housing from said lower end of the valve housing, wherein the lower edge is the high pressure edge and the lower end is the high pressure end.

7. The valve of claim 6, including: a sealing arrangement comprising said valve member having said bore, a seal for sealing said bore with respect to said piston disposed centrally within the bore and providing a larger diameter portion engaging, or closer to, the wall of said bore and a smaller diameter portion on a higher pressure side of said larger diameter portion, said seal comprising a resilient material which is generally U-shaped in half-section along the axis of said bore, the seal providing a base part abutting a shoulder extending from the periphery of said larger diameter part to the periphery of said smaller diameter part, said base providing the base of the U-section, the seal including an inner sleeve, defining an inner limb of said U-section and extending around said smaller diameter part, and extending away from said base to a free edge, the seal further including an outer sleeve extending from said base part along said bore to a free edge of the outer sleeve, said outer sleeve defining the other limb of said U-section, and wherein said outer sleeve, in an unstressed state of said seal, wherein said unstressed state is an un-installed state diverges slightly from the axis of the seal, with increasing distance from said base, wherein said base part has a thickness greater than twice the greatest radial thickness of said outer sleeve and greater than twice the greatest thickness of said inner sleeve.

8. The valve of claim 6, including: a sealing arrangement wherein the inner sleeve, in an un-stressed state of the seal, converges slightly towards said central axis of the seal with increasing distance from said annular base.

* * * * *

UNITED STATES PATENT AND TRADEMARK OFFICE
CERTIFICATE OF CORRECTION

| | | |
|---|---|---|
| PATENT NO. | : 7,604,218 B2 | Page 1 of 1 |
| APPLICATION NO. | : 10/537615 | |
| DATED | : October 20, 2009 | |
| INVENTOR(S) | : Kay | |

It is certified that error appears in the above-identified patent and that said Letters Patent is hereby corrected as shown below:

Title page, Item (54) first column, Col. 1 line 1, "VALVES" should read --IMPROVEMENTS IN OR RELATING TO VALVES--.

Title page, Item (56) second column, "2,806,471 A * 9/1957 Faust............137/116.5" should read --2,806,481 A * 9/1957 Faust............137/116.5--, which is a duplicate of the next reference listed.

Signed and Sealed this

Sixth Day of April, 2010

David J. Kappos
*Director of the United States Patent and Trademark Office*